United States Patent
Mihara et al.

(10) Patent No.: US 6,646,436 B2
(45) Date of Patent: Nov. 11, 2003

(54) HDD HEAD HOLDING APPARATUS WITH HEAT COMPENSATION

(75) Inventors: Takahisa Mihara, Hyogo (JP); Toshiki Kita, Hyogo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/122,501

(22) Filed: Apr. 15, 2002

(65) Prior Publication Data

US 2003/0042895 A1 Mar. 6, 2003

(30) Foreign Application Priority Data

May 31, 2001 (JP) ........................... 2001-165612

(51) Int. Cl.⁷ .................. G11B 21/00; G11B 21/16; G11B 5/48; G01R 33/12
(52) U.S. Cl. ............... 324/212; 324/225; 360/75; 360/240; 360/290
(58) Field of Search ................... 324/210, 212, 324/225; 360/240, 250, 255.1, 260, 266.2, 270, 290, 294.1–294.4, 75, 76, 77.01

(56) References Cited

U.S. PATENT DOCUMENTS

| 4,602,305 A | * | 7/1986 | Ghose .................. 360/294.1 X |
| 4,843,503 A | * | 6/1989 | Hazebrouck et al. .... 360/246.6 |
| 4,881,142 A | * | 11/1989 | Kato et al. ........... 360/97.04 X |
| 5,036,417 A | * | 7/1991 | Aruga et al. ............. 360/267.2 |
| 6,147,831 A | * | 11/2000 | Kennedy et al. .......... 360/75 X |

FOREIGN PATENT DOCUMENTS

| JP | 61-237274 | * 10/1986 |
| JP | 11216643 A | 8/1999 |

* cited by examiner

Primary Examiner—Gerard R. Strecker

(57) ABSTRACT

The support that bears and positions the head in a head holding apparatus is further supported by a heat-compensating member, so that when the support is expanded by the heat source of the head holding apparatus, the heat-compensating member expands in the direction opposite to the direction of expansion of the support. Moreover, supplying of heat to the support and heat-compensating member is further alleviated by insulating said heat source with an insulating material. The amount of displacement of the recording element per unit of time with exposure to heat is controlled by the above-mentioned structure and effects.

6 Claims, 14 Drawing Sheets

HDD HEAD HOLDING APPARATUS WITH HEAT COMPENSATION

BACKGROUND OF THE INVENTION

1. Field of the Invention

The present invention pertains to a head holding apparatus that is used in devices that test one or both of the head and disk of a hard disk drives, and relates to a device having a means for controlling the amount of head displacement per unit of time with exposure to heat, so that fluctuations in test results are controlled.

2. Discussion of the Background Art

Hard disk drives (HDDs) are widely used for information recording media for recording large volumes of digital data, beginning with electronic computers.

HDDs generally comprise a substrate, one or more magnetic disks, which is a non-magnetic disk material covered with a magnetic thin film, a rotating spindle that is anchored to the substrate and rotates the magnetic disk at high speed, a slider with a head, which is the recording element and reproducing element, at its surface, head gimbal assemblies (HGAs) with the sliders at its end, a suspension arm that supports the HGA, and a rotary actuator that is anchored to the substrate and drives the arm. Furthermore, one HDD has several magnetic disks and heads, depending on the recording capacity of the HDD.

The working principle of the HDD is as follows: The center of a magnetic disk is held by a spindle that rotates at high speed from 4,000 to 15,000 rotations per minute. The slider is guided by an arm that is driven by a rotary actuator and moved so that the trace between the outer periphery and the innermost periphery of the magnetic disk forms an arc. Moreover, when information is being recorded or retrieved, the slider that is above the magnetic disk maintains a tilted posture so that a wedge-shaped space is formed with the magnetic disk as the slider floats a very small distance above the magnetic disk in the air current that is produced on the surface of the magnetic disk that is rotating at a high speed. Once the slider has been positioned at a predetermined position on the magnetic disk by the rotary actuator, the magnetic disk is magnetized and information is recorded by the recording element attached to the slider. Moreover, the magnetic field from the magnetic disk is detected and information is retrieved by the reproducing element attached to the same slider.

Furthermore, recording and retrieving of information are performed in the memory area that has been made by physically subdividing the magnetic disk recording surface. For instance, reading and writing are performed on an circular memory area called a track having a predetermined width that has been made along the concentric circumference of the magnetic disk.

The HDD accumulates information and therefore, each part comprising the HDD undergoes rigorous testing because there must be complete reliability during recording and retrieving of information. A head testing device that records or retrieves information on a magnetic disk for testing and evaluates the performance and properties of the head is used to test heads.

An oblique view of a conventional head testing device 10 is shown in FIG. 1A, and a side view of the same head testing device 10 is shown in FIG. 1B. Head testing device 10 in FIGS. 1A and 1B consists of reference table 11, cassette 30 that holds head 20 at the end, carriage 12 that holds cassette 30, piezo stage 13 that fine-positions carriage 12 horizontally with respect to reference table 11, head loading mechanism (HLM) 14 that positions piezo stage 13 perpendicularly with respect to reference table 11, stage 15 anchored above reference table 11 that coarse-positions HLM 14 horizontally with respect to reference table 11, and disk rotating device drive 50 anchored above reference table 11 that holds the center of magnetic disk 40 with rotating shaft 51 so that magnetic disk 40 is horizontal with respect to reference table 11 and magnetic disk 40 is rotated around its axis using motor 52.

Cassette 30 has head holding part 31 that holds head 20, connector 32, support 33 that is connected to carriage 12 by connector 32 and supports head holding part 31, and amplifier 35 that is connected to head 20 via signal line 34 and processes electrical signals transmitted to and received from head 20. Cassette 30 can be disconnected from the head testing device as needed because it has connector 32 and therefore, the heads that are the subject of tests performed by the head testing device can be replaced as needed when heads are loaded on each cassette.

Moreover, although not illustrated, in addition to the above-mentioned structural elements, head testing device 10 has external arithmetic and control unit M and input-output unit P. Arithmetic and control unit M controls stage 15, HLM 14, piezo stage 13 and disk rotating device drive 50 based on commands that are input by the user through input-output unit P, and further, is connected to amplifier 35 and transmits and receives electrical signals to and from amplifier 35 in order to process and analyze the electrical signals that are transmitted and received, etc. In addition, the analysis results and operating status, etc., are further input to input-output unit P and communicated to the user as needed.

A summary of the effects of the above-mentioned structure is as follows: Piezo positioner or stage 13 is coarse-positioned by stage 15 and then carriage 12 is fine-positioned by piezo stage 13. Head 20 is positioned at a predetermined position above magnetic disk 40 by these positioning operations. Furthermore, head 20 is moved up and down above magnetic disk 40 by HLM 14 and floats above the surface of magnetic disk 40 or rests above the surface of magnetic disk 40. Head 20 generates a magnetic field when it floats above the surface of magnetic disk 40 and writes information on magnetic disk 40 or detects a magnetic field and reads information from the magnetic disk.

The following are items evaluated by a head testing device: the track average amplitude (TAA), which is the average amplitude of retrieving signals that are output from the head; the track profile (TP) representing the distribution of TAAs relative to displacement from the track center line (TCL) within a track; the overwrite (OW), which is represented by the attenuation factor of the lowest frequency signals (LF signals hereafter) when the highest frequency signals (HF signals hereafter) are overwritten on LF recorded on a magnetic disk; the bit error rate (BER); etc. The intensity of the magnetic field generated by the magnetic information that has been written on the magnetic disk changes with the position of the head within a track. Consequently, the head positioning accuracy (positioning accuracy hereafter) in the direction of track width above the magnetic disk has a strong effect on the measurement accuracy of the test items when evaluating the above-mentioned test items. Particularly high head-positioning accuracy is needed in BER tests, etc., because determination time is long in comparison to the other test items.

Nevertheless, it has become difficult to achieve the head-positioning accuracy that is now required with the progress that has been made in HDD technology. The reason for this is that signals that are transmitted to and received from the head have become faster as a result of the recent increase in the data transmission speed of the HDD. The amplifier of the head testing device must be placed near the head in order to control the attenuation of faint signals from the head, and there are many cases where the amplifier is loaded on the cassette. However, the amplifier begins to generate heat at the same time when the measurements are started. Therefore, the dimensions of the cassette change as it expands when exposed to the heat generated by the amplifier. As a result, the head slips (drifts hereafter) from the predetermined position within the determination track and there is a marked compromise of measurement reliability.

A cross section of cassette 30 is shown in FIG. 2. It is an example of the effect of drift. Cassette 30 has head holding part 31 that holds head 20, connector 32, support 33, and amplifier 35 connected to head 20 via signal line 34, and further has anchoring pin 36 that by all appearances protrudes to the side where the cassette is connected to carriage 12. Anchoring pin 36 is pushed into hole 37 in carriage 12 in order to secure the reference point for the entire cassette 30 when cassette 30 is connected to carriage 12. For convenience, connector 32 is not illustrated. When the effective length relating to the positioning of support 33, which supports and positions the head, that is, the distance in the direction of length of support 33 from the center of anchoring pin 36 to the point of application of head 20, is 50 mm and support 33 is made from corrosion-resistant aluminum (linear expansion coefficient of 23.4 ppm), thermal expansion of support 33 will occur with a change in temperature of 1° C., causing it to drift 1,200 nm. A substantial amount of drift of 590 nm occurs when the skew angle, which is the angle formed by the track tangent and the head, becomes 30°. A drift of 590 nm corresponds to displacement by 2 track widths or more when a head of 100 kTPI, or track interval of 250 nm, is tested, and causes the head to be completely off the measurement track.

Constructing a cassette using a material with a small thermal expansion coefficient, such as Invar, etc., has been considered as a method of controlling drift, but materials with a small linear expansion coefficient are primarily ferromagnetic and are inappropriate for head testing devices that use magnetic fields because they have an effect on the determinations. Moreover, controlling the effect of drift by positioning with a piezo stage when the cassette is in a thermally stable state, that is, when the amount of drift has become constant, has also been considered, but there is a problem in that stand-by time until the cassette reaches a thermally stable state impacts production cost.

Therefore, there is a demand for a device with which the amount of displacement of the head per of unit time is controlled, even during the transient period until the cassette reaches a thermally stable state, that is, the period when there is continuous marked thermal expansion of the cassette, so that the positioning accuracy of the head required by the cassette is not compromised, even in cases when the head testing device begins testing the head immediately after the cassette has been connected to the testing device.

SUMMARY OF THE INVENTION

The purpose of the present invention is to solve the above-mentioned problems of prior art, its object being to control the amount of displacement of the head per unit of time, which is caused by thermal expansion of the support, and thereby control fluctuations in the measurement results that are obtained when testing one or both of the head and the disk by supporting the support of the head by means of a heat-compensating member in the cassette that holds the head.

Moreover, another object is to control the size of the cassette by using a structure where two or more parts with different linear expansion coefficients are layered in the heat-compensating member.

In short, the first subject of the invention is a head holding apparatus that is used in order to hold a head or the assembly on which said head is loaded in testing devices that test one or both of said head and recording medium or disk, characterized in that it comprises an anchoring means that anchors the position of the above-mentioned head holding apparatus and a support that supports the above-mentioned recording element at a predetermined position with the above-mentioned anchoring means as the criterion, and in that the above-mentioned support is also supported by a heat-compensating member arranged parallel to the above-mentioned support and when the above-mentioned support expands with exposure to heat, the heat-compensating member expands by the same amount as the above-mentioned support to control the amount of displacement of the head per unit of time with exposure to heat.

The second subject of the invention is characterized in that one or both of the above-mentioned support and the above-mentioned heat-compensating member of the first subject of the invention has a structure wherein the friction that is produced between the above-mentioned support and the above-mentioned heat-compensating member is reduced at that place where the above-mentioned support and the above-mentioned heat-compensating member oppose one another so that the above-mentioned support and the above-mentioned heat-compensating member will expand smoothly when exposed to heat.

The third subject of the invention is characterized in that there is a damping member placed between the above-mentioned support and the above-mentioned heat-compensating member at that place where the above-mentioned support and the above-mentioned heat-compensating member oppose one another in the second subject of the invention so that the resonance of the above-mentioned support is controlled.

Furthermore, the fourth subject of the invention is characterized in that there is a means for reducing the temperature difference between said support and said heat-compensating member in the first, second or third subject of the invention.

In addition, the fifth subject of the invention is characterized in that the above-mentioned heat-compensating member in the first, second, third or fourth subject of the invention has a structure wherein two or more members with different linear expansion coefficients are alternately layered.

Figure 1A:
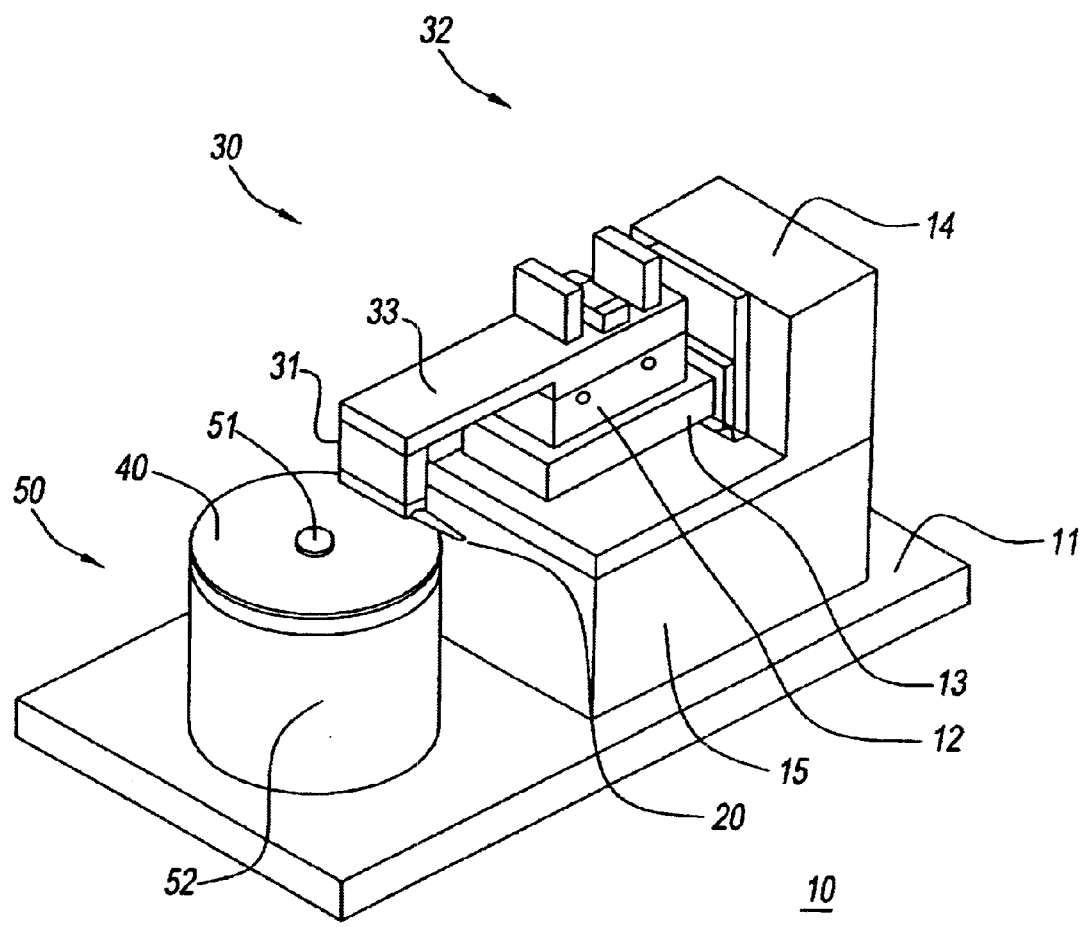
FIG. 1A is an oblique view of a head testing device with a cassette of the prior art.
Figure 1B:
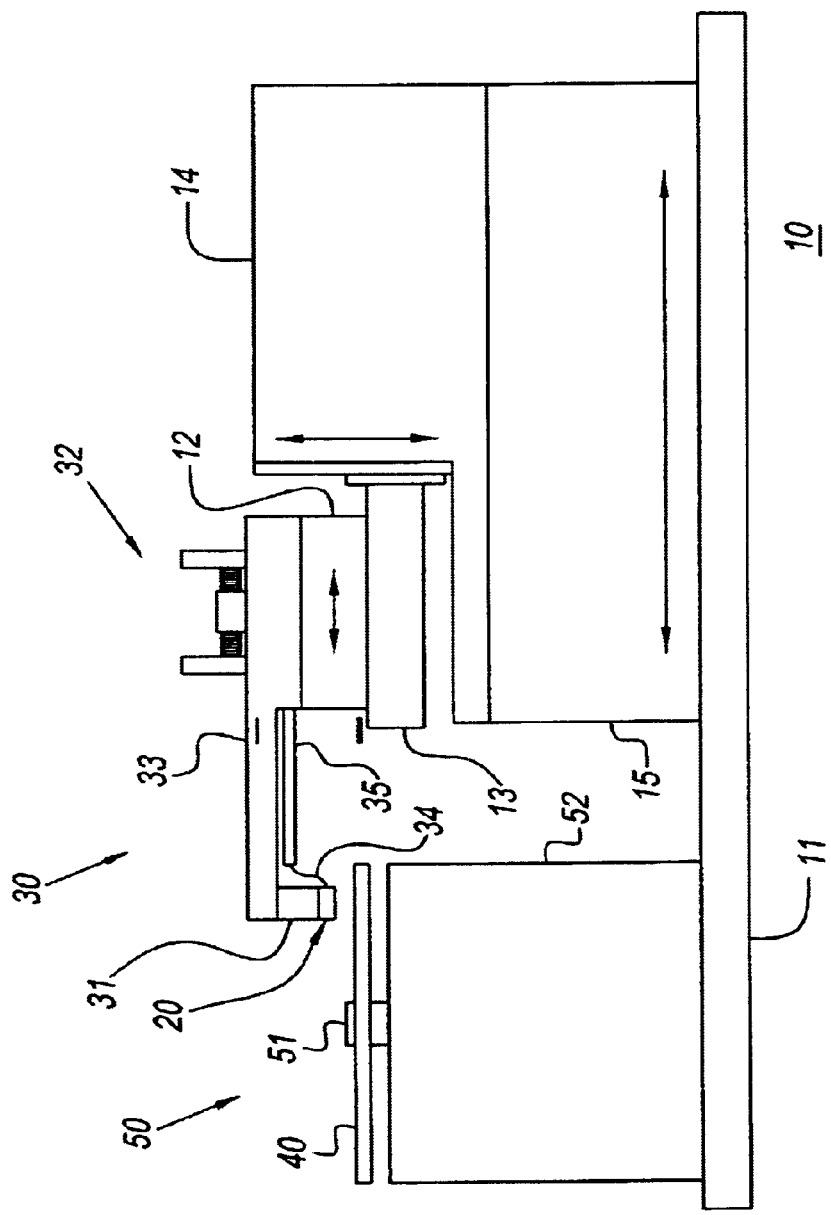
FIG. 1B is a side view of a head testing device with a cassette of the prior art.
Figure 2:
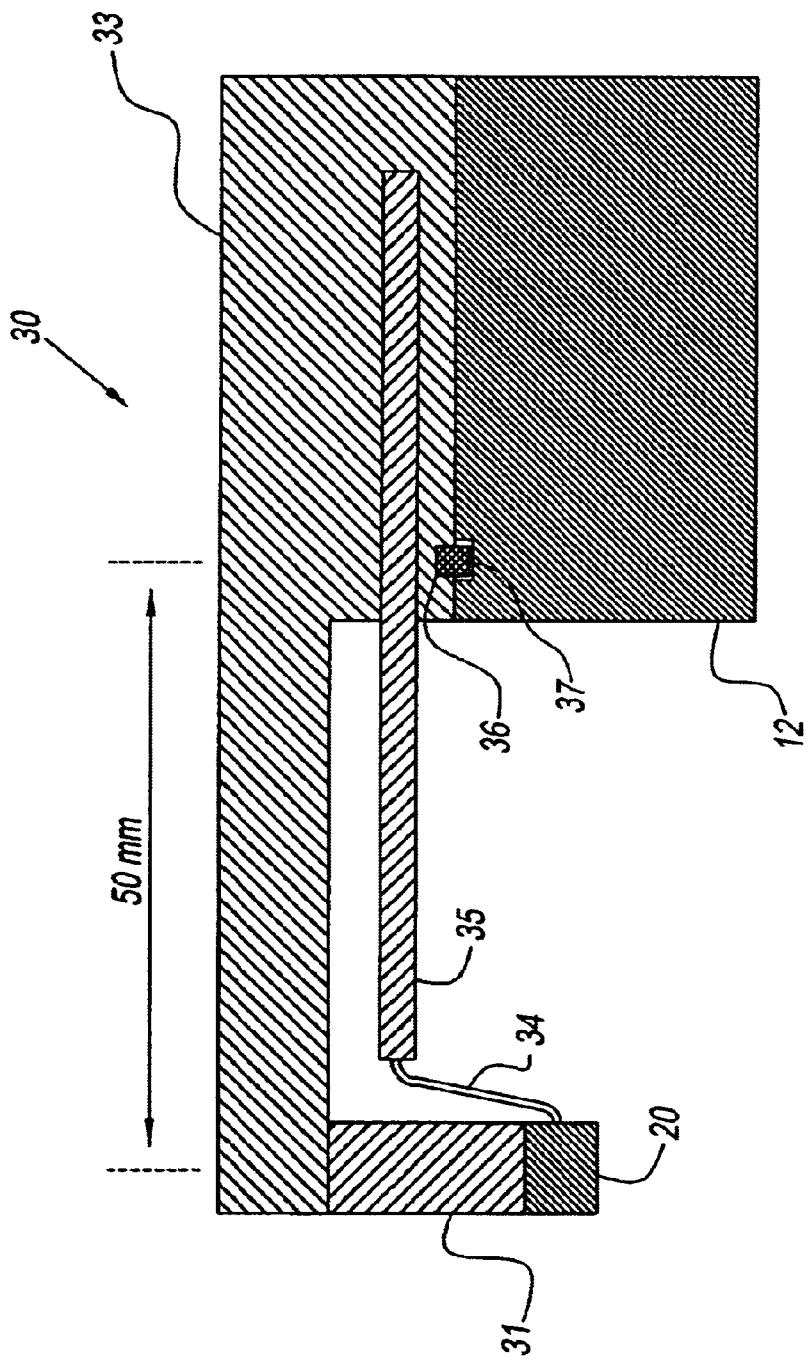
FIG. 2 is a cross section of a cassette of the prior art.

The following definitions are presented to provide a better understanding of the Figures in conjunction with the following detailed description of the invention.

Definition of Symbols 10, 200. Head testing device
11. Reference table
12. Carriage
13. Piezo stage
14. HLM
15. Stage
20. Head
30, 60, 80, 90, 100. Cassette
31, 61, 81, 91, 101. Head holder
32, 62. Connector
32a, 62a, 62b. Lever
32b, 62c. Spring anchoring means
33, 63, 83, 93, 103. Support
34, 64, 84, 94, 104. Signal line
35, 65, 85, 95, 105. Amplifier
36, 66, 86, 96, 106. Anchoring pin
37, 67, 87, 97, 107. Hole
40. Magnetic disk
50. Disk rotating device drive
51. Spindle
52. Motor
62d, 62e. Spring
62f. Support rod
62g. Engagement groove
62h. Engagement rod
62p. Pinch piece
68, 88, 98, 108a, 108b, 108c. Heat-compensating member
69, 89, 99, 109a, 109b, 109c. Connecting means
82. Insulating member
92. Damping material

DETAILED DESCRIPTION OF THE INVENTION

Figure 3:
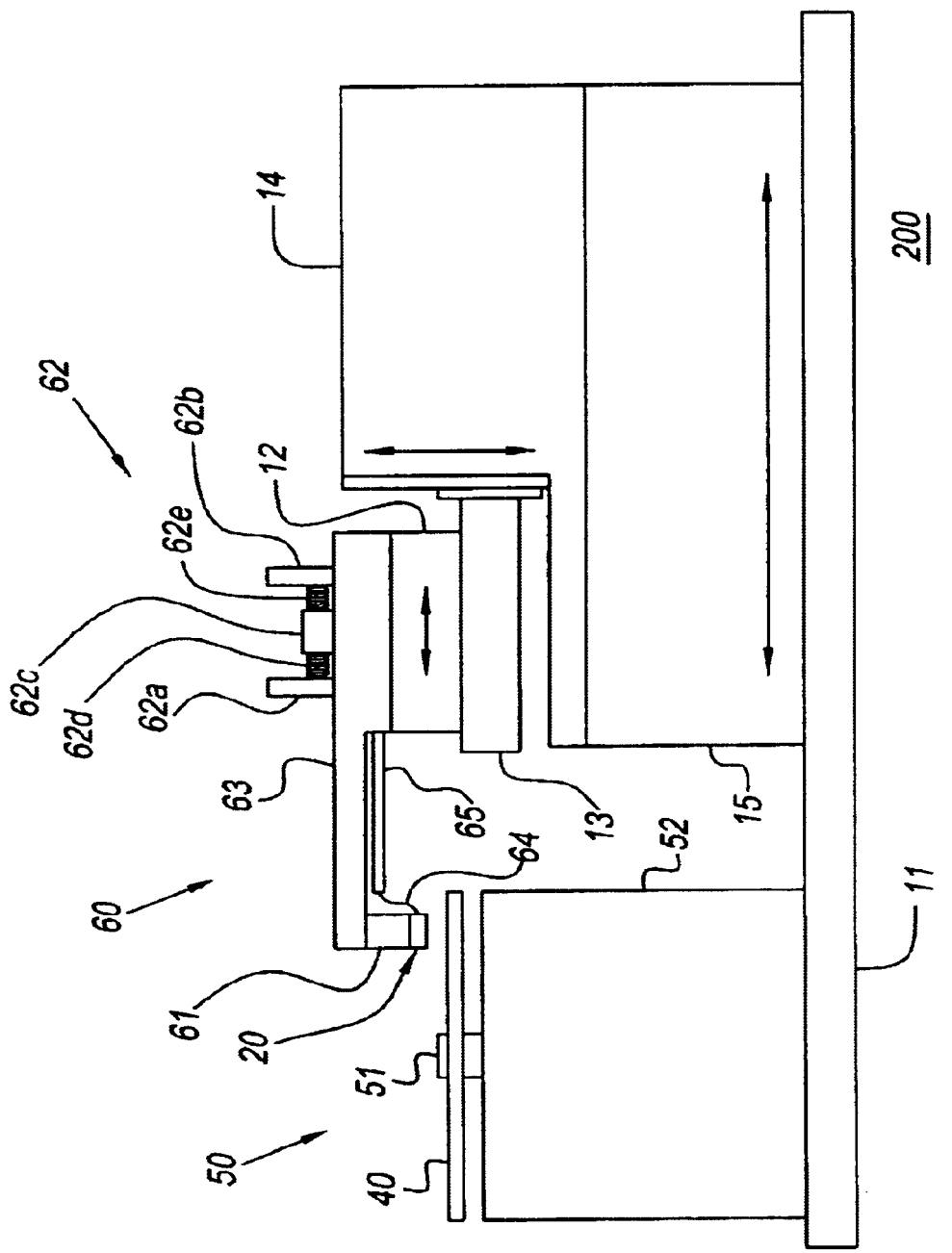
FIG. 3 is a side view of the first example of the head testing device with a cassette of the present invention.

The present invention will now be described based on the examples shown in the attached drawings. In the example shown in FIG. 3, cassette 60, which is an example of the head holding apparatus used by the present invention, is used attached to head testing device 200, which tests head 20 as an example of a recording element. The figure is a side view of the cassette joined with head testing device 200.

Head testing device 200 consists of reference table 11, cassette 60 that holds head 20 at the end, carriage 12 that holds cassette 60, piezo stage 13 that fine-positions carriage 12 horizontally with respect to reference table 11, HLM 14 that positions piezo stage 13 perpendicularly with respect to reference table 11, stage 15 anchored above reference table 11 that coarse-positions HLM 14 horizontally with respect to reference table 11, and disk rotating device drive 50 anchored above reference table 11 that holds the center of magnetic disk 40 with rotating shaft 51 so that magnetic disk 40 is horizontal with respect to reference table 11 and magnetic disk 40 is rotated around its axis using motor 52.

Figure 4A:
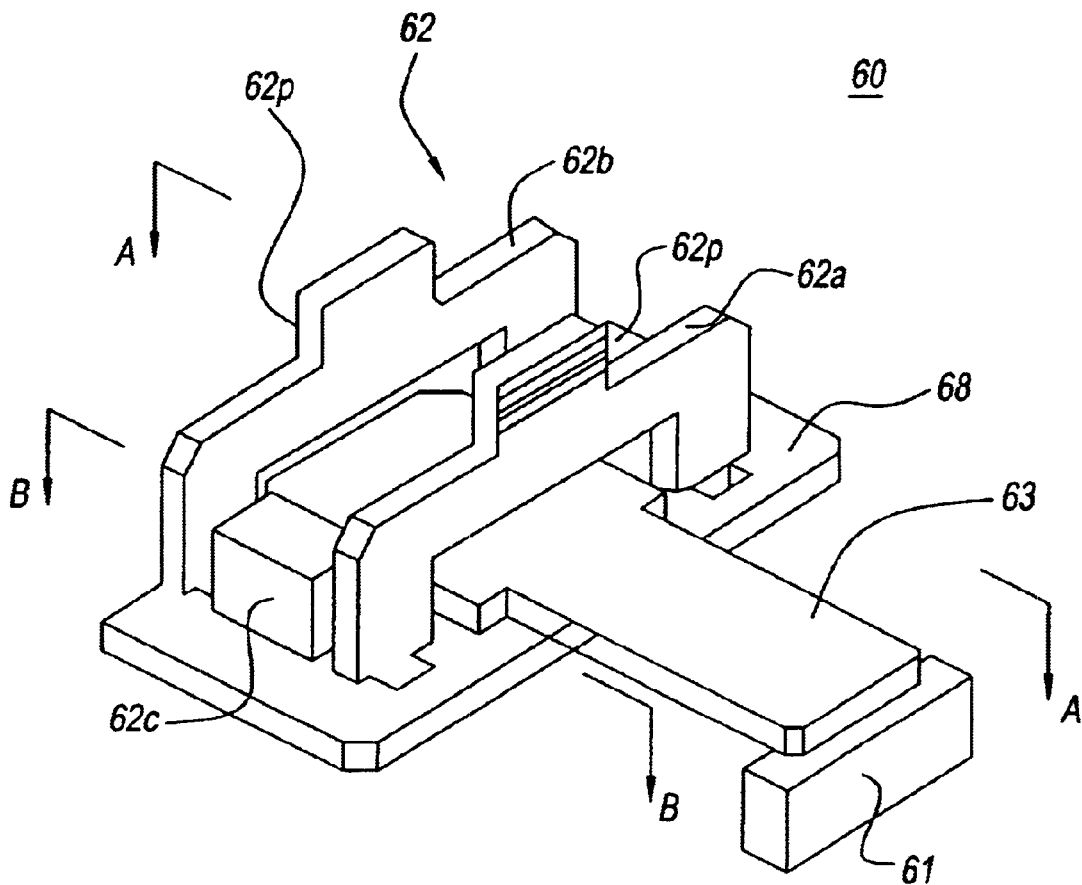
FIG. 4A is an oblique view as seen from above of the cassette of the first example of the present invention.
Figure 4B:
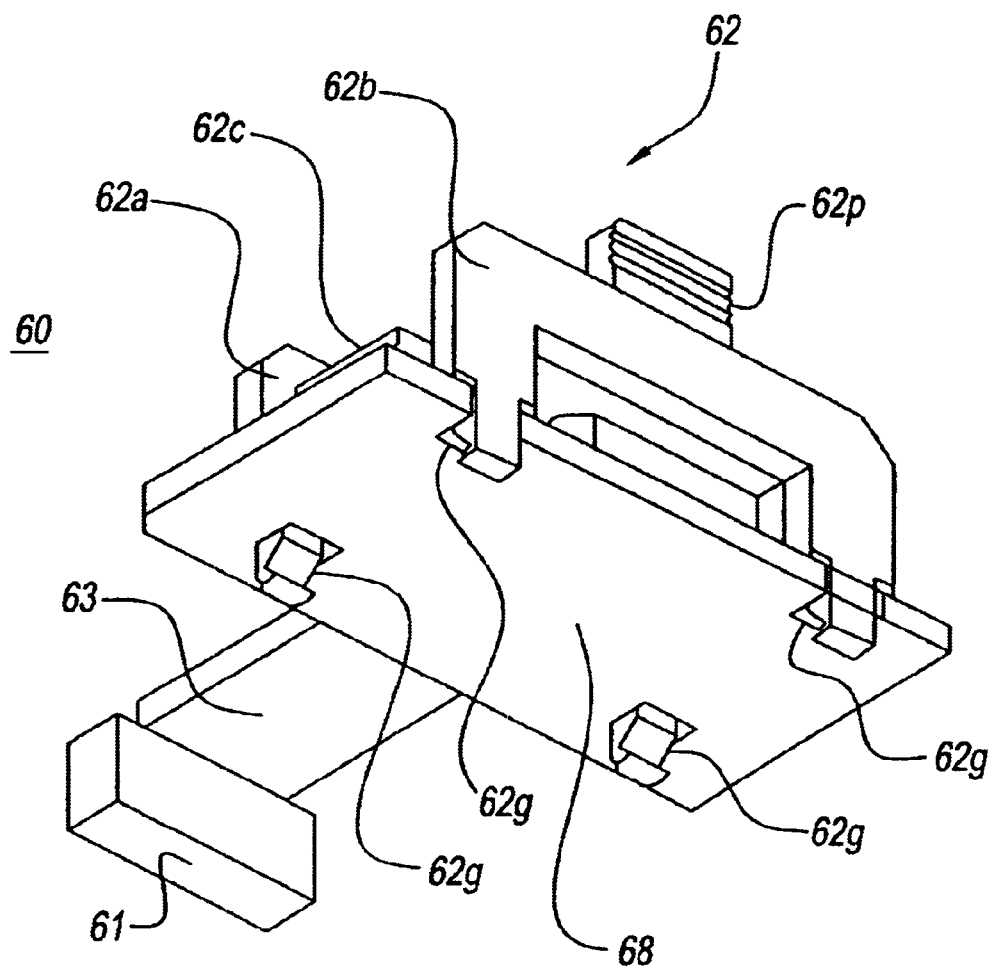
FIG. 4B is an oblique view as seen from below of the cassette of the first example of the present invention.

Only cassette 60 is now excerpted, and an oblique view of cassette 60 as seen from the top is shown in FIG. 4A, while an oblique view of cassette 60 as seen from the bottom is shown in FIG. 4B.

Cassette 60 has head holding part 61 that holds head 20, support 63, which is a plate that supports head holding part 61, heat-compensating member 68, which is a plate that is wider than support 63 and that is parallel to support 63 and that bears support 63, amplifier 65 that processes the electrical signals transmitted to and received from head 20, and connector 62 that anchors heat-compensating member 68 to carriage 12.

Connector 62 has levers 62a and 62b in the shape of an upside-down U, spring anchoring means 62c in the shape of a square pole, and springs 62d and 62e.

Levers 62a and 62b have pinch piece 62p that has been non-slip-finished at the top, and engagement groove 62g for engagement with carriage 12 at the 2 bottom ends.

Cassette 60 can be disconnected from head testing device 200 as needed because it has connector 62 and therefore, the heads that are the subject of tests by the head testing device can be replaced as needed when heads are loaded on each cassette.

Figure 5A:
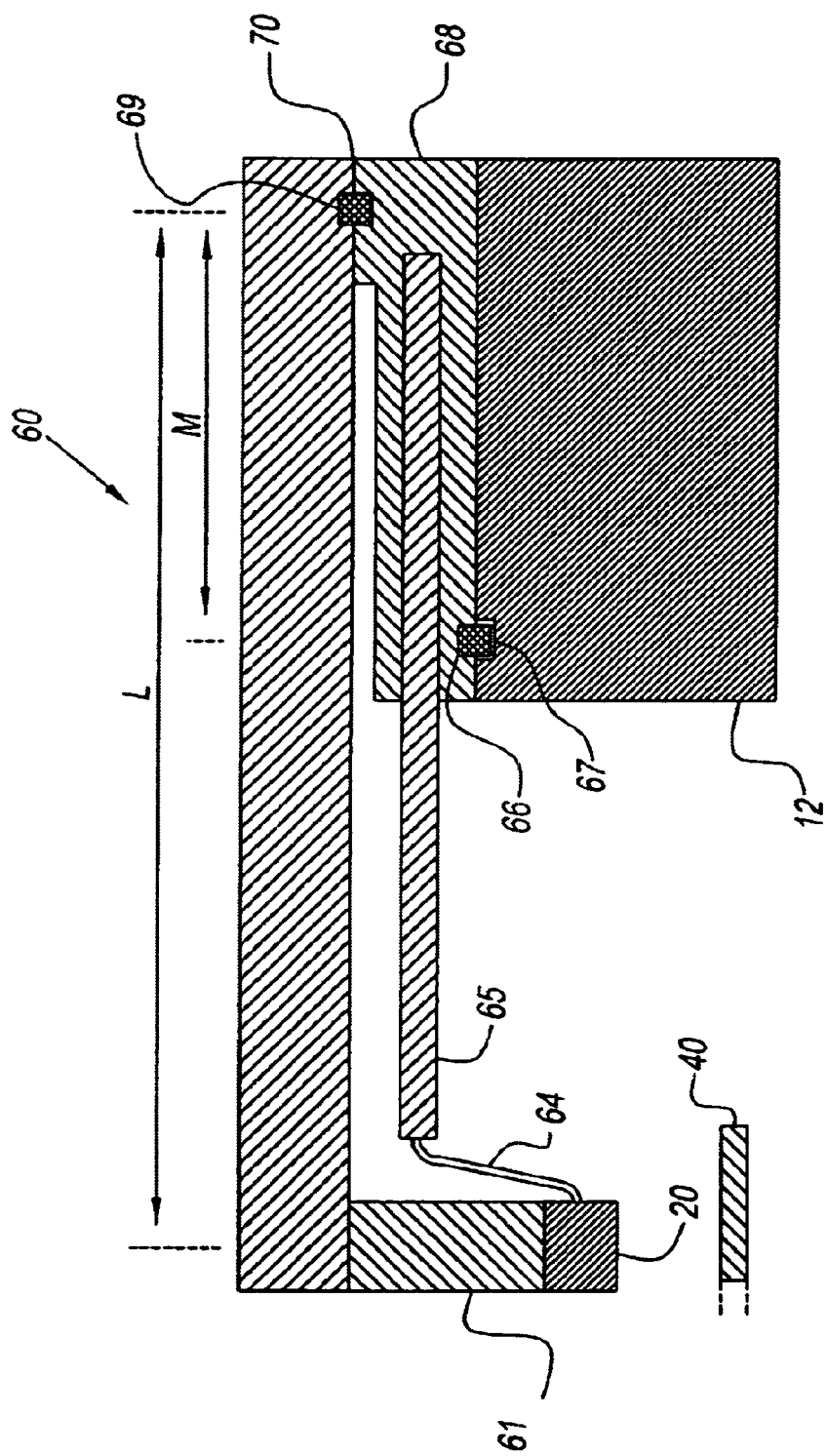
FIG. 5A is the A—A cross section of the cassette of the first example of the present invention.

The A—A cross section of cassette 60 from which the connector in FIG. 4A has been removed, that is, a drawing of support 63 and heat-compensating member 68 dissected in the middle, is shown in FIG. 5A. Moreover, in order to simplify the description, carriage 12 to which cassette 60 is attached, cassette 60 which holds head 20, and magnetic disk 40 are also illustrated.

Amplifier 65 is set up very close to the connector so that part of amplifier 65 is in heat-compensating member 68 and is connected to head 20 via signal line 64.

Heat-compensating member 68 has anchoring pin 66, which is an example of an anchoring means and by all appearances protrudes to the side where heat-compensating member 68 is attached to carriage 12, at the end opposite magnetic disk 40. When heat-compensating member 68 expands with exposure to heat, heat-compensating member 68 expands with anchoring pin 66 as the reference. Here, anchoring pin 66 is pushed into hole 67 in carriage 12 and functions as a reference point for the entire cassette 60, that is, the reference point relating to the positioning of the head held by the cassette. Moreover, the other end of heat-compensating member 68 is connected to support 63 by connecting means 69, and support 63 is positioned with anchoring pin 66 as the reference. Furthermore, the surface of heat-compensating member 68, with the exception of joint 70 adjacent to connecting means 69, is removed in order to eliminate any direct contact between heat-compensating member 68 and support 63 so that friction that is produced between support 63 and heat-compensating member 68 is reduced at the side of heat-compensating member 68 where support 63 and heat-compensating member 68 oppose one another and support 63 and heat-compensating member 68 will expand smoothly when exposed to heat.

Support 63 is placed on top of heat-compensating member 68 and supported at one end opposite magnetic disk 40 so that head holding part 61 is suspended and is connected to heat-compensating member 68 by connecting means 69 at the other end. Head 20 is positioned with connecting means 69 as the reference. In addition, when support 63 expands with exposure to heat, support 63 expands with connecting means 69 as the reference.

Figure 5B:
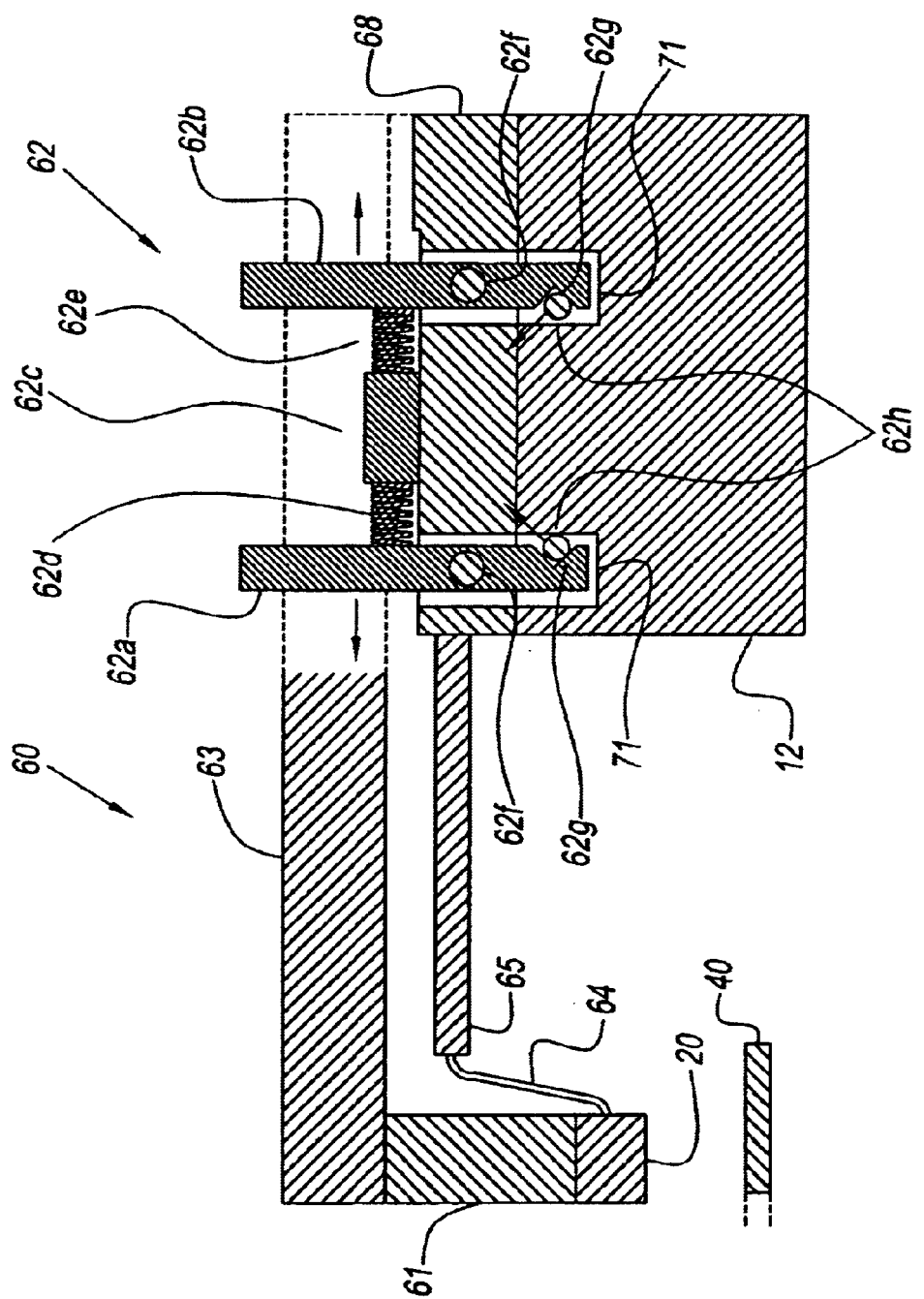
FIG. 5B is the B—B cross section of the cassette of the first example of the present invention.

In order to clarify the connection mechanism of the connector, the B—B cross section of cassette 60 in FIG. 4A, that is, a drawing of the levers of connector 62 dissected in the middle, is shown in FIG. 5B. In order to simplify the description, a partial side view of cassette 60 is also shown in FIG. 5B.

Connector 62 has levers 62a and 62b, spring anchoring means 62c in the shape of a square pole, and springs 62d and 62e. One end of springs 62d and 62e is anchored to each side of spring anchoring means 62c, which itself is anchored to heat-compensating member 68, so that springs 62d and 62e will stretch horizontally with respect to heat-compensating member 68, and further, the other ends of springs 62d and 62e are connected to levers 62a and 62b, respectively, having the effect of levers 62a and 62b pushing away from one another. In addition, for the two levers 62a and 62b shown in FIG. 5B, spring 62d that pushes the lever closest to magnetic disk 40 pushes the lever under a force (pressure hereafter) that is sufficiently higher than that of the other spring 62e so that when heat-compensating member 68 expands, anchoring pin 66 becomes the reference. That is, since hole 67 in which anchoring pin 66 is pushed is somewhat larger than anchoring pin 66 so that anchoring pin 66 can be pushed into hole 67, anchoring pin 66 is anchored to either side inside hole 67 under the pressure from springs 62d and 62e of connector 62 and the positioning accuracy of cassette 60 is thereby kept high with good reproducibility.

Levers 62a and 62b have the shape of an upside down U and the tips of levers 62a and 62b pass through heat-compensating member 68 and are plunged into holes 71 made in carriage 12. Moreover, the tips of levers 62a and 62b have V-shaped engagement grooves 62g so that the levers engage with engagement rods 62h horizontally inside holes 71. Furthermore, levers 62a and 62b are supported by support rods 62f inside heat-compensating member 68 so that each pinch piece 62p is sandwiched in between. Engagement rod 62h and engagement groove 62g are disengaged by pushing to shorten the distance between pinches 62p so that cassette 60 can be removed from carriage 12.

Here, the effective length relating to the positioning of head 20 in FIG. 5A, that is, the distance in the direction of length of support 63 from the center of connecting means 69 to the point of application of head 20, is L (mm) and the linear expansion coefficient of support 63 is α (ppm). Moreover, the effective length relating to positioning of support 63 of heat-compensating member 68, that is, the distance in the direction of length of heat-compensating member 68 from the center of anchoring pin 66 to the center of connecting means 69 is M (mm) and the linear expansion coefficient of heat-compensating member 68 is β (ppm). The above-mentioned four parameters, L, M, α and β, are selected so that βM=αL is established at this time. In this example, stainless steel is used for support 63 and aluminum is used for heat-compensating member 68 and therefore, α=10.3 ppm and β=23.2 ppm, and the length of support 63 and heat-compensating member 68 is L=63 mm and M=28 mm, respectively. /The present invention is constructed as described above and its effects are described below: When cassette 60 is connected to carriage 12 and measurements are started, electricity is generated and amplifier 65 begins to generate heat. The heat generated by amplifier 65 is supplied to heat-compensating member 68 and heat-compensating member 68 expands so that support 63 is kept away from magnetic disk 40, with anchoring pin 66 as the reference. Moreover, heat-compensating member 68 and support 63 are connected by connecting means 69, and heat-compensating member 68 supplies the heat that has been introduced from amplifier 65 to support 63, resulting in support 63 expanding in the direction of magnetic disk 40, with connecting means 69 as the reference. Thus, support 63 and heat-compensating member 68 thermally expand in opposite directions from one another and as a result, the expansion of both the support and the heat-compensating member with exposure to heat is cancelled out and drift at the point of application of the head is controlled. Here, the amount of drift ε when the temperature of the entire cassette has risen uniformly by 1° C. is 0.7 nm/° C. based on the following formula, and it is clear that the degree of thermal expansion is kept very low. Furthermore, the amount of drift is positive in the direction in which the point of application of the head is kept away from the magnetic disk.

$$\varepsilon = \beta \cdot M - \alpha \cdot L \qquad \text{Formula 1}$$
$$= 10.3 \cdot 10^{-6} \times 63 \cdot 10^{-3} - 23.2 \cdot 10^{-6} \times$$
$$28 \cdot 10^{-3} = 0.7 \text{ nm/}^\circ \text{ C.}$$

Figure 6:
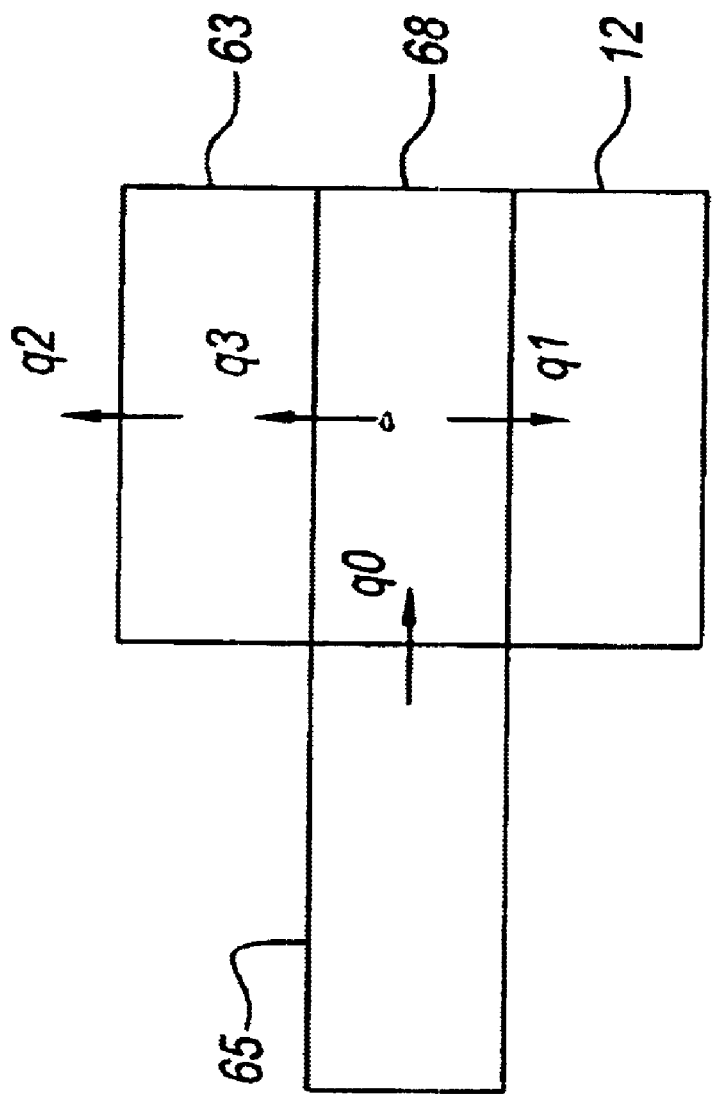
FIG. 6 is a heat model diagram of the cassette of the first example of the present invention.

Moreover, it is difficult to uniformly raise the temperature of the entire cassette 60 by heat radiation from each structural element or the coefficient of thermal conductivity between each structural part of an actual cassette 60, and the drift of cassette 60 is not a simple change involving multiplication by the temperature of cassette 60 in the above-mentioned formula. Therefore, the drift of cassette 60 will be described in further detail:

A model relating to the heat of cassette 60 is illustrated in FIG. 6. The main heat source that is responsible for the expansion of cassette 60 is amplifier 65 attached to cassette 60. The amplifier supplies heat q0 to heat-compensating member 68. The heat-compensating member further supplies heat q0 that has been supplied by amplifier 65 to support 63 as heat q3 and to carriage 12 as heat q1. Moreover, support 63 radiates part of heat q3 that has been supplied by the heat-compensating member into the air as heat q2. Here, the above-mentioned parameters, q0, q1, q2, q3, T1 and T2, are related in the following formulas where the temperature of heat-compensating member 68 is T1 and the temperature of support 63 is T2:

$$dT1 = \frac{q0 - q1 - q3}{V1} dt \qquad \text{Formula 2}$$

$$dT2 = \frac{q3 - q2}{V2} dt \qquad \text{Formula 3}$$

$$q0 = q1 + q3 \qquad \text{Formula 4}$$

$$q1 = o1 \times T1 \qquad \text{Formula 5}$$

$$q2 = \sigma 2 \times T2 \quad \text{Formula 6}$$

$$q3 = \gamma \times (T1 - T2) \quad \text{Formula 7}$$

Furthermore,

σ1: Heat radiation efficiency from the heat-compensating member to the carriage=1.4 W/K σ2: Heat radiation efficiency from the support to the air=0.1 W/K A: Set-up surface area=4 cm² d1: Thickness of the heat-compensating member=5 mm d2: Thickness of the support=5 mm h1: Coefficient of thermal conductivity of the heat-compensating member=220 W/mK h2: Coefficient of thermal conductivity of the support=24.2 W/mk γ: Apparent coefficient of thermal conductivity $$= \frac{a}{\frac{0.5 \cdot d1}{h1} + \frac{0.5 \cdot d2}{h2}}$$

V1: Heat capacity of the heat-compensating member=v1×m1=18 J/K

V2: Heat capacity of the support=v2×m2=18.4 J/K v1: Specific heat of the heat-compensating member=0.90 J/gK v2: Specific heat of the support=0.46 J/gK m1: Mass of the heat-compensating member=20 g m2: Mass of the support=40 g T1 (s) and T2 (s) are found by substituting q1, q2, and q3 for above-mentioned dT1 and dT2 and Laplace transformation.

$$sT1 = \frac{q0 - \sigma 1 T1 - \gamma(T1 - T2))}{V1} \quad \text{Formula 8}$$

$$sT2 = \frac{\gamma(T1 - T2 - \sigma 2 T2)}{V2} \quad \text{and therefore,} \quad \text{Formula 9}$$

$$T1(s) = \frac{\frac{q0}{V1}\left(s + \frac{\sigma 2 + \gamma}{V2}\right)}{s^2 + \left(\frac{\sigma 1 + \gamma}{V1} + \frac{\sigma 2 + \gamma}{V2}\right)s + \frac{(\sigma 1 + \gamma)(\sigma 2 + \gamma) - \gamma^2}{V1V2}} \quad \text{Formula 10}$$

$$T2(s) = \frac{\frac{q0}{V1} \cdot \frac{\gamma}{V2}}{s^2 + \left(\frac{\sigma 1 + \gamma}{V1} + \frac{\sigma 2 + \gamma}{V2}\right)s + \frac{\sigma 1 \sigma 2 + \sigma 1 \gamma + \sigma 2 \gamma}{V1V2}} \quad \text{Formula 11}$$

Furthermore, T1 (t) and T2 (t) are found by inverse Laplace transformation of T1 (s) and T2 (s).

$$T1(t) = \frac{q0}{V1}\left[\frac{C3 + C4}{ab} + \frac{\frac{C3+C4}{a} - 1}{a-b}e^{-at} - \frac{\frac{C3+C4}{b} - 1}{a-b}e^{-bt}\right] \quad \text{Formula 12}$$

$$T2(t) = \frac{q0}{V1}\left[\frac{C4}{ab} + \frac{\frac{C4}{a}}{a-b}e^{-at} - \frac{\frac{C4}{b}}{a-b}e^{-bt}\right] \quad \text{Formula 13}$$

Furthermore, $$C1 = \frac{\sigma 1 + \gamma}{V1} + \frac{\sigma 2 + \gamma}{V2}$$

$$C2 = \frac{\sigma 1 \sigma 2 + \sigma 1 \gamma + \sigma 2 \gamma}{V1V2}$$

$$C3 = \frac{\sigma 2}{V2}$$

$$C4 = \frac{\gamma}{V2}$$

$$a = \frac{C1 - \sqrt{C1^2 - 4 \cdot C3}}{2}$$

$$b = \frac{C1 + \sqrt{C1^2 - 4 \cdot C3}}{2}$$

Figure 10:
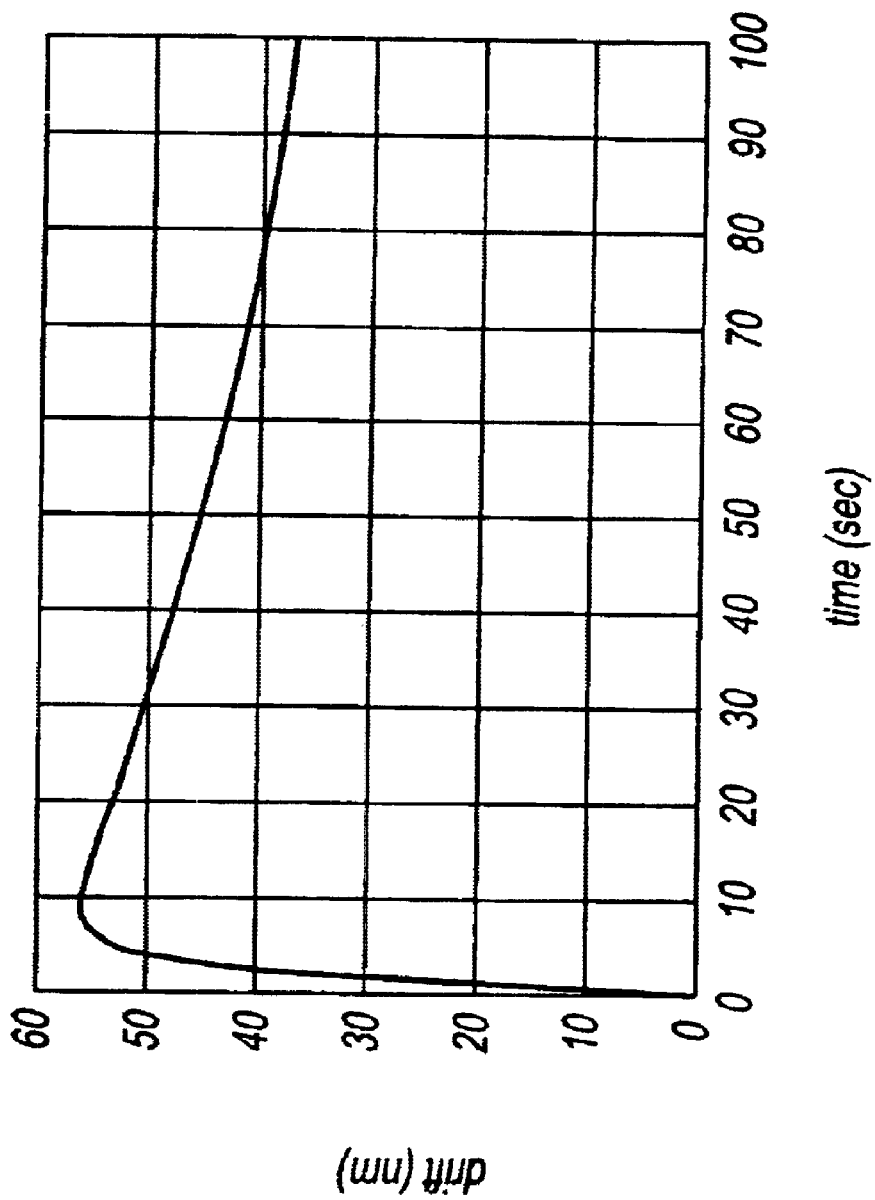
FIG. 10 is a graph showing the drift property of the cassette of the first example of the present invention.

Essential drift ε (t) is the difference in the amount by which support 63 and heat-compensating member 68 expand with exposure to heat and is represented by the following formula. Moreover, a graph from the following formula is shown in FIG. 10.

$$\epsilon(t) = \beta \cdot M \cdot T1(t) - \alpha \cdot L \cdot T2(t) \quad \text{Formula 14}$$

Here, when the temperature difference between T1(t) and T2(t) is Td (t), the above-mentioned formula becomes the following formula:

$$Td(t) = T1(t) - T2(t) \quad \text{Formula 15}$$

$$= \frac{q0}{V1}\left[\frac{C3}{ab} + \frac{\frac{C3}{a} - 1}{a-b}e^{-at} - \frac{\frac{C3}{b} - 1}{a-b}e^{-bt}\right]$$

$$\epsilon(t) = (\beta \cdot M - \alpha \cdot L)T2(t) + \beta \cdot L \cdot Td(t) \quad \text{Formula 16}$$

The first term on the right can be kept very small by supporting the support by means of the heat-compensating member so that they cancel out the amount by which the other stretches with exposure to heat.

Consequently, ideally, the drift represented by the above-mentioned formula is predominantly the second term on the right when α, β, L and M are selected. That is, controlling the temperature difference Td (t) in turn controls drift.

Figure 7:
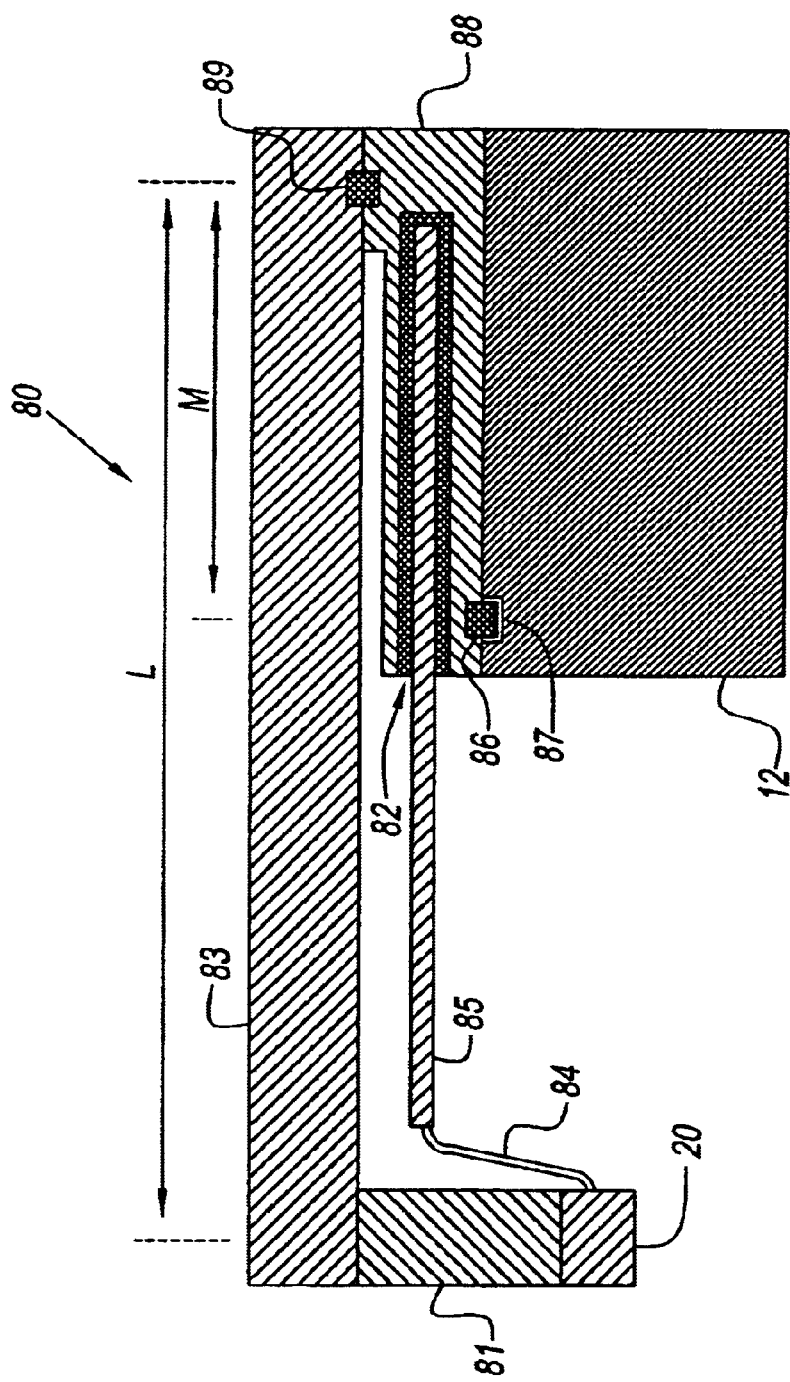
FIG. 7 is a cross section of the cassette of the second example of the present invention.

A second example will now be described as an example with a means for controlling this temperature difference Td (t). This example is similarly a cassette 80, and a cross section of cassette 80 is shown in FIG. 7. Cassette 80 has head holding part 81 that holds head 20, support 83 that supports head holding part 81, heat-compensating member 88 that is arranged parallel to support 83 and bears support 83, and amplifier 85 that processes electrical signals transmitted from and received by head 20 via signal line 84. Furthermore, insulating member 82 is further placed between amplifier 85 and heat- compensating member 88 in cassette 80 of this example.

Heat-compensating member 88 has an anchoring pin 86, which is an example of an anchoring means and by all appearances protrudes to the side of heat-compensating member 88 that is attached to carriage 12, at the end opposite magnetic disk 40, and when heat-compensating member 88 expands with exposure to heat, heat-compensating member 88 expands with anchoring pin 86 as the reference. Here, anchoring pin 86 is pushed into hole 87 in carriage 12 and functions as a reference point for the entire cassette 80, that is, the reference point relating to the positioning of the head held by the cassette. The other end of heat-compensating member 88 is connected to support 83 by connecting means 89 and support 83 is positioned with anchoring pin 86 as the reference.

Support 83 is placed above heat-compensating member 88 and is supported at one end opposite magnetic disk 40 so that head holding part 81 is suspended. It is connected at the other end to heat-compensating member 88 by connecting means 89 and head 20 is positioned using connecting means 89 as the reference.

Figure 11:
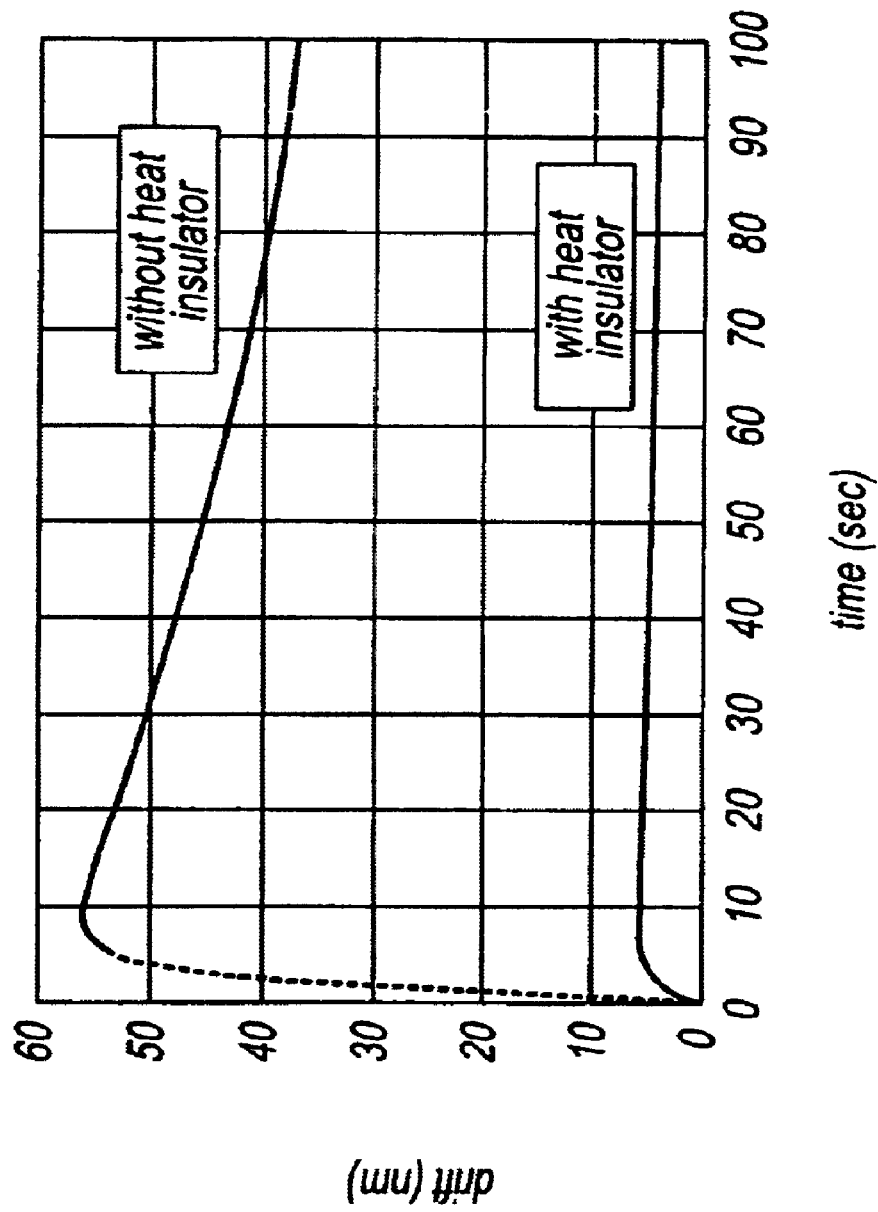
FIG. 11 is a graph showing the drift property of the cassette of the second example of the present invention.

This example is constructed as described above and its effects are described below: When cassette 80 is connected to carriage 12 and measurements are started, electricity is introduced and amplifier 85 begins to generate heat. The source of thermal expansion is then the same as in the first example, but the heat generated by amplifier 85 is introduced through insulating member 82 to heat-compensating member 88. Consequently, q0 in the first term on the right side of formula 15, that is, heat that is received by the heat-compensating member, is controlled and as a result, the temperature difference between support 83 and heat-compensating member 88 is reduced as shown in FIG. 11, so that drift is controlled to $1/100^{th}$ or more of that in the past.

Moreover, in addition to the fact that parameters are selected so that the second term on the right, that is, the temperature difference between support 83 and heat-compensating member 88, is reduced, drift can also be controlled by selecting parameters so that, although it occurs within a limited time range, the first term on the right is negative and the second term on the right is positive, and thus the first and second terms on the right cancel one another out.

Figure 8:
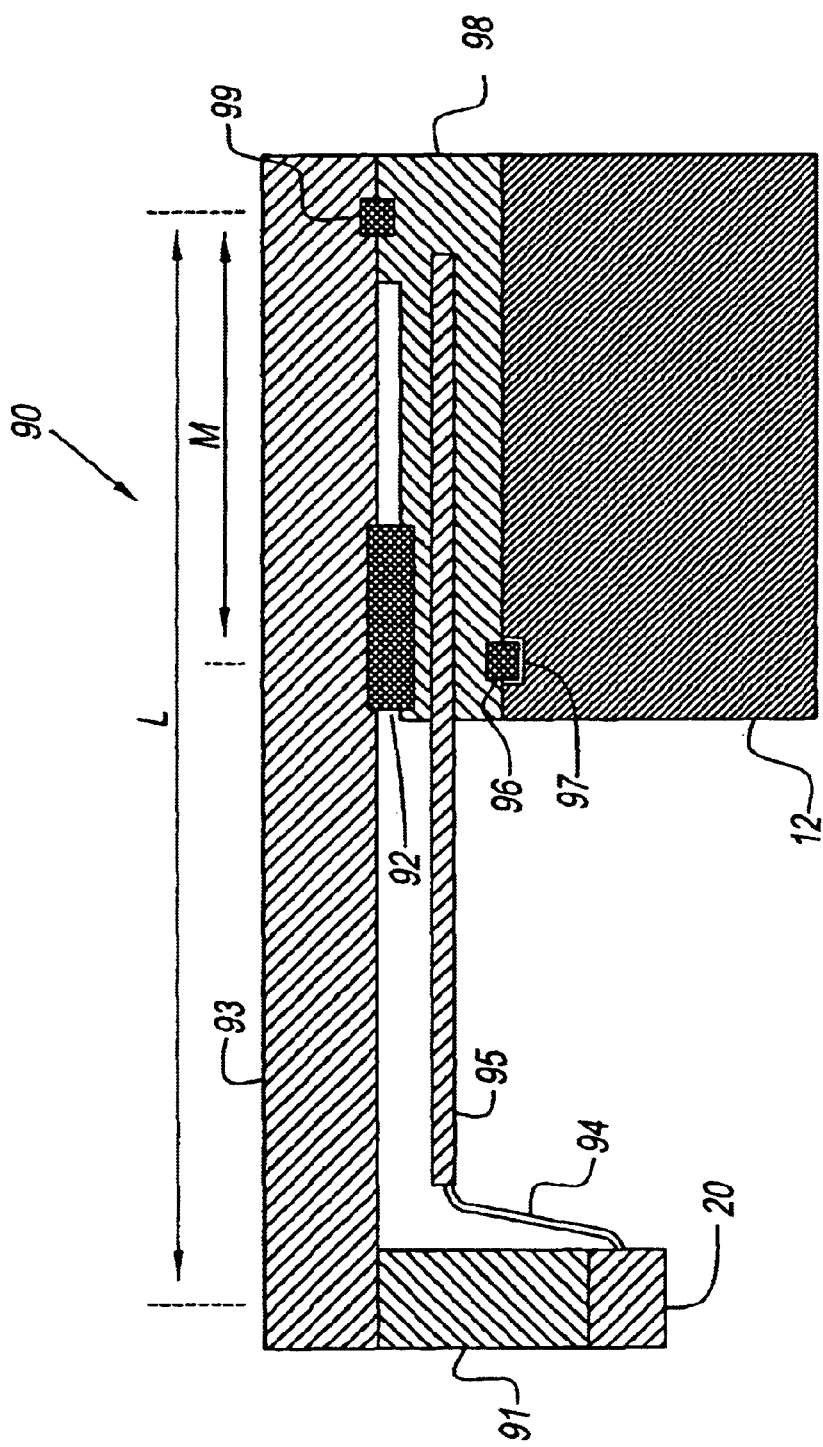
FIG. 8 is a cross section of the cassette of the third example of the present invention.

By means of the first example, the surface of heat-compensating member 68, with the exception of joint 70 near connecting means 69, is removed in order to eliminate any direct contact between heat-compensating member 68 and support 63, so that friction that is produced between support 63 and heat-compensating member 68 is reduced on the side of heat-compensating member 68 where support 63 and heat-compensating member 68 oppose one another and support 63 and heat-compensating member 68 will expand smoothly when exposed to heat. As a result, there are cases in which the resonance frequency of support 63 is reduced and support 63 can easily resonate to vibrations that are produced when cassette 60 is moved by the positioning device, resulting in drift with exposure to heat, and the head test results are then affected. Therefore, a third example is shown as an example of effectively controlling drift with exposure to heat. This example is the same cassette 90 as in the first example, and a cross section of cassette 90 is shown in FIG. 8. Cassette 90 has head holding part 91 that holds head 20, support 93 that supports head holding part 91, heat-compensating member 98 that is arranged parallel to support 93 and bears support 93, and amplifier 95 that processes electrical signals transmitted to and received from head 20 via signal line 94. By means of this example, cassette 90 further has a counter-bore made in each side where support 93 and heat-compensating member 98

Heat-compensating member 98 has anchoring pin 96, which is an example of an anchoring means and by all appearances protrudes to the side where heat-compensating member 98 is attached to carriage 12, at one end opposite magnetic disk 40. When heat-compensating member 98 expands with exposure to heat, heat-compensating member 98 expands with anchoring pin 96 as the reference. Here, anchoring pin 96 is pushed into hole 97 in carriage 12 and functions as a reference point for the entire cassette 90, that is, the reference point relating to the positioning of the head held by the cassette. Moreover, the other end of heat-compensating member 98 is connected to support 93 by connecting means 99, and support 98 is positioned with positioning pin 96 as the reference.

Support 93 is placed on top of heat-compensating member 98 and supported at one end opposite magnetic disk 40 so that head holding part 91 is suspended. It is connected to heat-compensating member 98 by connecting means 99 and head 20 is positioned with connecting means 99 as the reference.

This example is constructed as previously described, and its effects are described below: Cassette 90 is moved by the positioning device and resonates at a predetermined frequency, depending on the length and rigidity of cassette 90, etc. Specifically, support 93 vibrates perpendicularly with respect to magnetic disk 40. Damping member 92 absorbs vibration energy to control the resonance.

Figure 9:
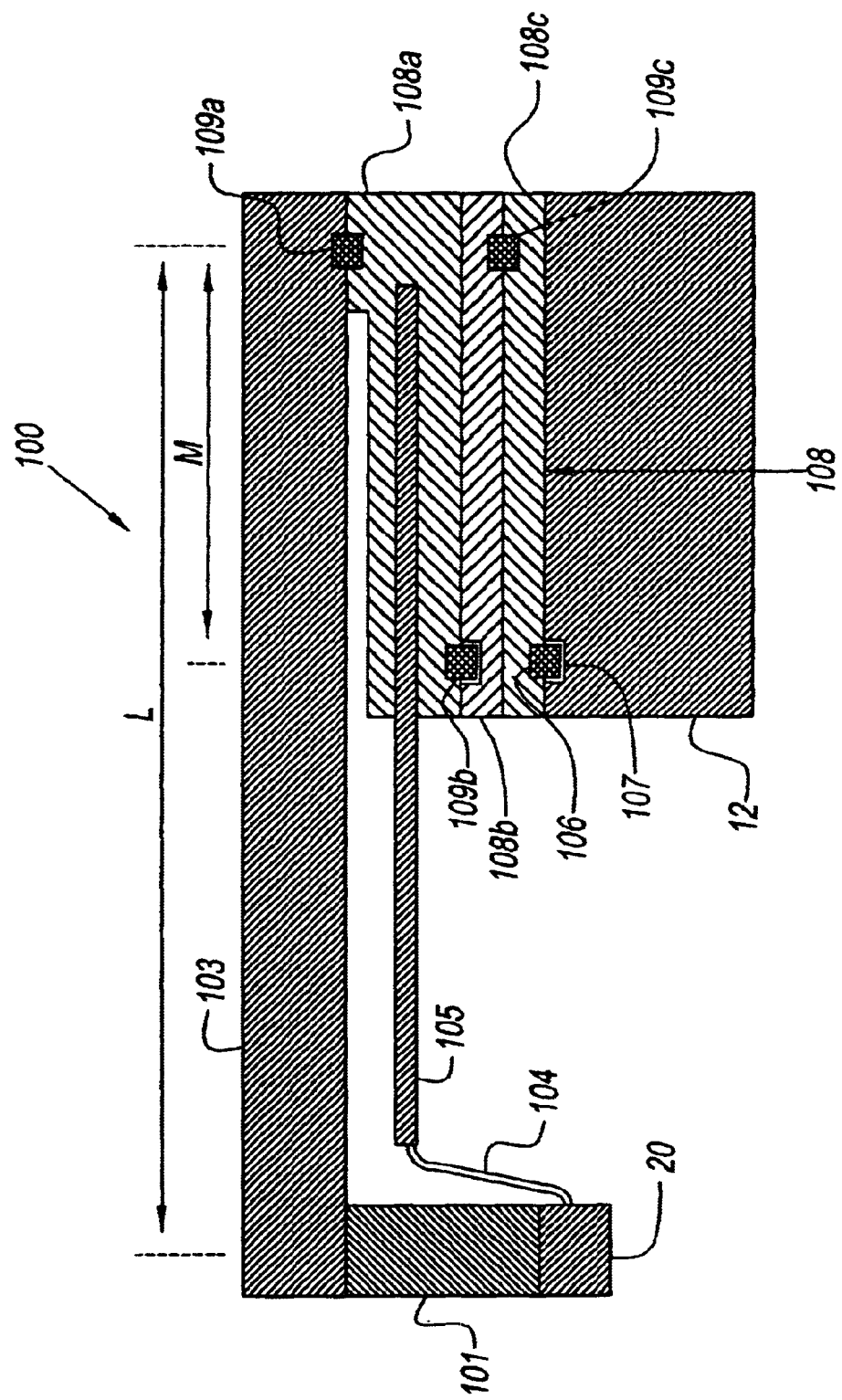
FIG. 9 is a cross section of the cassette of the fourth example of the present invention.

By means of the present invention, drift is controlled by combining a support with a heat-compensating member and adjusting their linear expansion coefficient and length, but as a result of this combination, the support and heat-compensating member have become longer and the size of the cassette itself has become larger. When the cassette is attached to the head testing device and positioning is performed, a large cassette will have an effect in that it curtails the range of cassette positioning and overall can compromise the performance of the head testing device. Therefore, a fourth example will be described as an example of a cassette with which enlargement of the cassette is controlled while maintaining the effect of controlling drift. The present example is a similar cassette 100. A cross section of cassette 100 is shown in FIG. 9. Cassette 100 comprises head holding part 101, which holds head 20, support 103 that supports head holding part 101, heat-compensating member 108 that is arranged parallel to support 103 and bears support 103, and amplifier 105 that processes electrical signals that are transmitted to and received from head 20 via signal line 104. Furthermore, heat-compensating member 108 has a layered structure.

Heat-compensating member part 108c comprises anchoring pin 106, which is an example of an anchoring means and by all appearances protrudes to the side where heat-compensating member part 108c is attached to carriage 12, at one end opposite magnetic disk 40. When heat-compensating member part 108c expands with exposure to heat, heat-compensating member part 108c expands with anchoring pin 106 as the reference. Here, anchoring pin 106 is pushed into hole 107 in carriage 12 and functions as a reference point for the entire cassette 100, that is, the reference point relating to the positioning of the head held by the cassette. The other end of heat-compensating member part 108c is connected to heat-compensating member part 108b by connecting means 109c and heat-compensating member part 108b is positioned with anchoring pin 106 as the reference.

Heat-compensating member part 108b is connected at one end opposite magnetic disk 40 to heat-compensating member part 108a by connecting means 109b and heat-compensating member part 108a is positioned with connecting means 109b at the other end as the reference.

Support 103 is placed on top of heat-compensating member part 108a and is supported at one end opposite magnetic disk 40, so that head holding part 101 is suspended. It is connected to heat-compensating member part 108a by connecting means 109a at the other end and head 20 is positioned with connecting means 109a as the reference.

This example is constructed as described above and its effects are described below: When cassette 100 is attached to carriage 12 and measurements are started, electricity is introduced and amplifier 105 begins to generate heat. The heat generated by amplifier 105 is supplied to support 103 and heat-compensating member parts 108*a*, 108*b*, and 108*c*. Support 103 expands in the direction of the magnetic disk 5 with connecting means 109*a* as the reference when exposed to the heat that has been introduced. Moreover, heat-compensating member part 108*a* expands so that support 103 moves away from the magnetic disk with connecting means 109*b* as the reference. Furthermore, heat-compensating member part 108*b* expands so that heat-compensating member part 108*a* moves in the direction of the magnetic disk with connecting means 109*c* as the reference. Heat-compensating member part 108*c* expands so that heat-compensating member part 108*c* moves away from magnetic disk 40 with anchoring pin 106 as the reference. It is possible to obtain a high linear expansion coefficient with a short length of heat-compensating member 108 by selecting a material with a high linear expansion coefficient for heat-compensating member parts 108*a* and 108*c* and a material with a low linear expansion coefficient for heat-compensating member part 108*b*, that is, materials that are different so that the heat-compensating member is not a continuous member comprised of the same material. As a result, the size of the cassette can be controlled while controlling drift at the site of application of the head.

As previously described in detail, the present invention is constructed and has the effects previously mentioned. By supporting the head with a heat-compensating member in a cassette that holds the head, the amount of displacement of the head per unit of time is controlled and fluctuations in determination results that are obtained when one or both of the head and disk are tested are controlled.

Moreover, the size of the cassette is controlled by using a heat-compensating member having a structure where two or more parts with different linear expansion coefficients are layered.

We claim:

1. A head holding apparatus holding a head or the assembly on which said head is loaded comprising:

an anchor for anchoring a position of said head holding apparatus; and a support bearing said head at a predetermined position with said anchoring means as a reference, wherein said support is supported by a heat-compensating member arranged parallel to said support so that when said member expands with exposure to heat, the heat-compensating member expands by a same amount as said support to control the amount of displacement of the head per unit of time with exposure to heats;

an insulator for reducing the temperature difference between said support and said heat-compensating member and located therebetween; and a connector for connecting said head holding apparatus to a testing device.

2. The head holding apparatus in claim 1, wherein one or both of said support and said heat-compensating member further comprises a structure wherein the friction that is produced between said support and said heat-compensating member is reduced in a place where said support and said heat-compensating member are opposite one another, so that said support and said heat-compensating member will expand smoothly when exposed to heat.

3. The head holding apparatus in claim 2, further comprising a damping material placed between said support and said heat-compensating member in said place where said support and said heat-compensating member oppose one another so that a resonance of said support is controlled.

4. The head holding apparatus in claim 1, wherein said means for reducing said temperature difference is a heat insulation means for blocking or reducing heat exchange with the outside.

5. The head holding apparatus in claim 1, wherein said heat-compensating member further comprises a structure wherein two or more parts with different linear expansion coefficients are alternately layered.

6. The head holding apparatus in claim 1, wherein a signal processor located substantially close to said head holding apparatus is connected to said head or said assembly, said signal processors generating heat when electricity is supplied thereto.

* * * * *